UNITED STATES PATENT OFFICE.

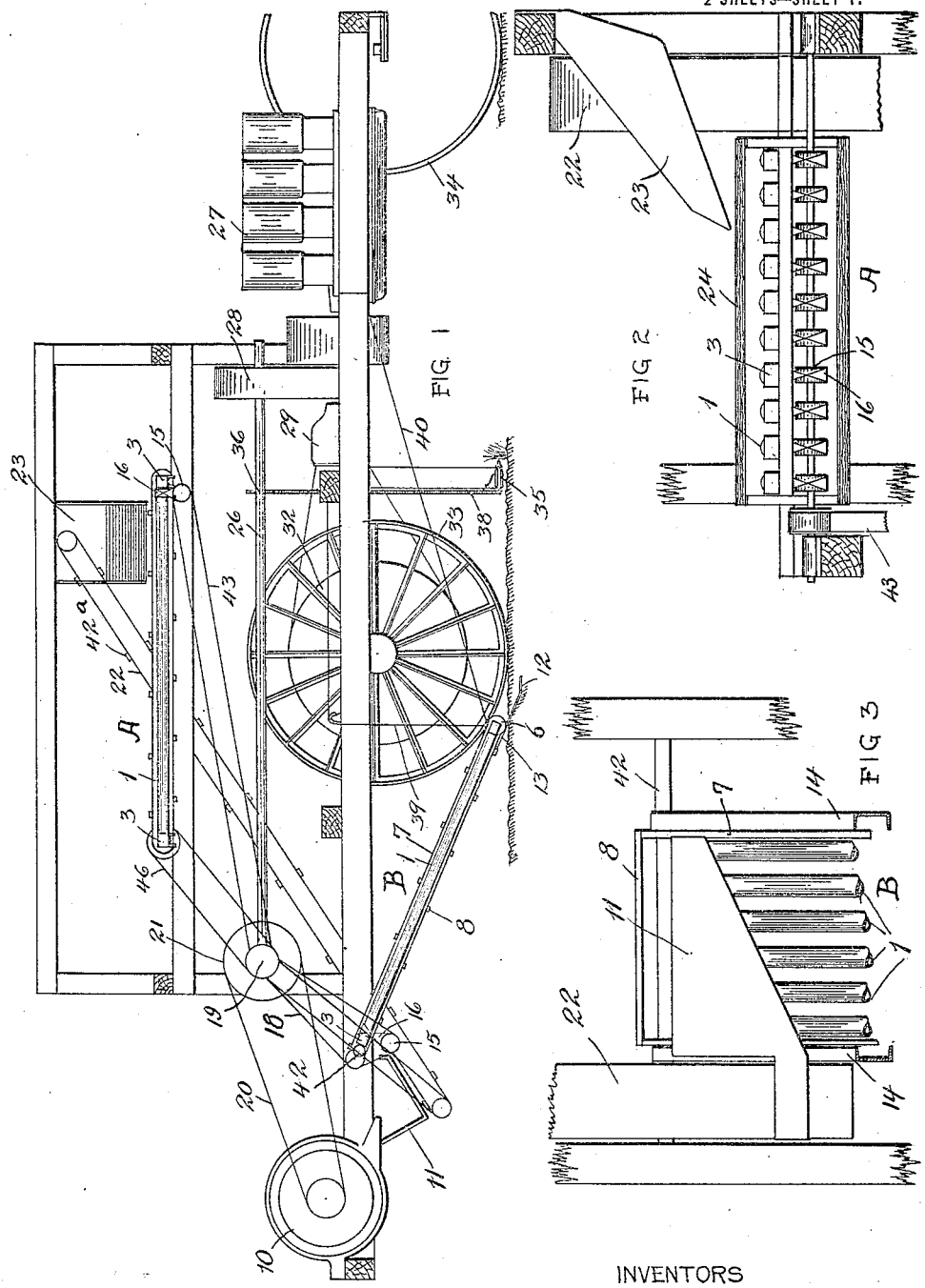

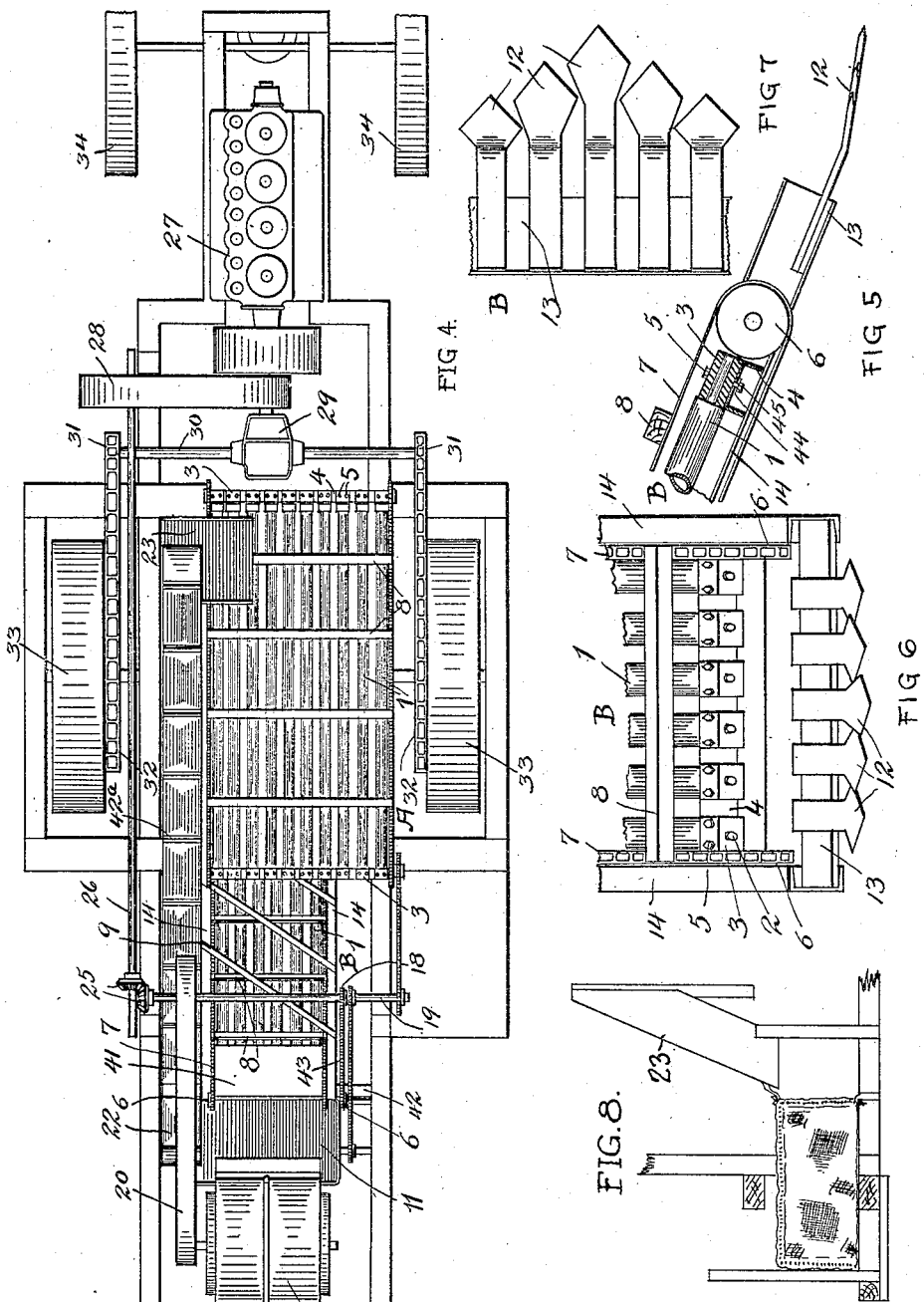

HARVEY F. UPTON, MILTON E. FISHER, AND GEORGE L. WOLF, OF STOCKTON, CALIFORNIA, ASSIGNORS, BY DIRECT AND MESNE ASSIGNMENTS, TO SAID WOLF AND HOWARD E. CRUSE, OF STOCKTON, CALIFORNIA.

POTATO-DIGGER.

1,279,793. Specification of Letters Patent. Patented Sept. 24, 1918.

Application filed August 16, 1917. Serial No. 186,508.

*To all whom it may concern:*

Be it known that we, HARVEY F. UPTON, MILTON E. FISHER, and GEORGE L. WOLF, citizens of the United States, residing at Stockton, in the county of San Joaquin and State of California, have invented certain new and useful Improvements in Potato-Diggers, of which the following is a specification.

This invention relates to a mechanical device the purpose of which is to provide mechanical means to unearth or dig potatoes or like produce, and at the same operation to eliminate all foreign matter as earth, weeds, etc., the entire process being accomplished by mechanical means. The apparatus is constructed in a novel way to enable this end being attained, and is constructed in such manner that a durable structure necessary for an apparatus of this kind can be built.

The invention has for its object to provide suitable means for cutting off the top or above ground growth of the product being dug, and at the same time digging under the growth below the surface of the ground and by the forwarding movement of the machine raising the product and foreign matter back to a position where the draper bars will convey potatoes and foreign matter over the surface of the separator, and finally depositing the cleaned produce in sacks on the sacking platform.

In order that the invention may be better understood, reference is had to the accompanying drawings forming a part of this specification, in which—

Figure 1 is a sectional elevation of the machine, for the purpose of mainly showing the relation of the component parts and the method of driving them; Fig. 2 is a partial sectional view looking at the end of the top separator and toward the back of the machine; this shows the chute supplying top separator; Fig. 3 shows an end view of lower separator looking from the back toward the front of the machine, this view showing the chute which supplies the conveyer from the lower separator;

Fig. 4 is a plan view of the machine; Fig. 5 is a partial sectional view looking at the lower separator, at the digging end, this being a transverse section; Fig. 6 is an end view of the digging end of the lower separator; Fig. 7 is a plan view of the digging prongs, and Fig. 8 shows chute from top separator to sacking platform.

Referring specifically to the drawings, rotatable rollers 1 of both top and lower separators A and B have spindles at each end 2 which are fitted and rotate in (wood or other suitable material) bearings 3, held in fixed position on angles 4 by bolts 5, nuts 45, and washer 44. The bolts when the nuts are unscrewed are free to slide in slot between angles 4, which allows for adjustment of the space between the rotatable rollers 1.

The draper sprocket wheels 6 transmit motion to the draper chain 7 which carries the draper bars 8. These draper bars extend across the entire width of both separators and are raised a short distance above the rotatable rollers 1, their function being to slide the earth and product along the surface of the rollers 1. The lower separator has in addition to the movable draper bars, fixed bars 9, placed at an oblique angle to gradually work off the separator large lumps of earth or other foreign matter that otherwise would not pass between the rollers 1.

A pressure blower 10 blows a blast of air the width of the lower separating rollers 1, the blast being directed between rollers 1 and the chute 11 which expels all foreign matter not having passed between the rollers 1.

The shield 41 is placed over the ends of the rollers and excludes any foreign material from getting into the twisted belt rotating the rollers 1.

The digging prongs 12 are sharp and pointed and flared out at their ends, being rigidly held by the cross plate 13, securely fastened at each end to the frame 14. It will be seen that the frame 14 also supports the angles 4, and draper sprockets 6. The frame 14 is pivoted on the cross shaft 42 which allows the entire lower separator to pivot around this point thereby regulating the depth of the cut desired.

A series of pulleys 15, one for each separating roller drive the rolls 1 by a twisted belt 16, motion and power being delivered to pulleys 15 by the chain drive 43. In the case of the lower separator the chain drive 43 also drives the draper sprocket. In the top separator the chain drive 43 drives the upper set of rollers 1 and the chain drive 46 drives the draper drive sprocket. The chain drives 43 receive their power and motion from sprocket 18 which is secured to line shaft 19.

The blower 10 receives its power by belt 20 from pulley 21 secured to line shaft 19.

The top separator is very similar in construction to the lower separator excepting that the lower separator has six rollers, and the top separator has ten rollers, although we do not confine the construction to any certain fixed number of rollers. It is desirable to have the greater number of rollers in the top separator. It will be seen by referring to the drawings that the top separator lies in a horizontal plane, the lower separator lies normally at an inclined plane, and the top separator also does not have the oblique bars 9.

The conveyer 22 receives the discharge from the lower separator by means of the chute 11, and this conveyer conveys the produce and the remaining foreign matter up and discharges into chute 23 which in turn discharges onto the top of the upper separating rolls, the draper bars 24 carrying the potatoes or like produce longitudinally along the rollers 1. The remaining dirt and foreign matter is agitated and broken up and eliminated by passing through the space between the rollers. The cleaned potatoes or products are discharged into the sacking chute from which they are sacked on the sacking platform.

The counter shaft 19 receives motion and power through the bevel gearing 25 and line shaft 26 which is connected to the motive power 27 by the belt 28.

The transmission gearing in the case 29 transmits the power and rotary motion to drive shaft 30, driving sprockets 31, which in turn drive large sprockets 32 and these sprockets being rigidly fastened to the driving wheels 33 to give power of locomotion to the entire apparatus.

Steering wheels 34 are operated in the ordinary manner as applied to vehicles of this kind for guiding and controlling the direction of the machine.

A sickle bar 35 being placed ahead of the digging prongs cuts down all growth above the surface of the ground. The sickle bar is driven from the line shaft 26 by sprocket 36, driving pitman 38. The sickle bar extends a distance each side of the lower separating rolls. The weeds and above ground growth are directed to one side of the machine where they are discarded.

The cable 39 provides means for raising the lower end of the separator and frame out of the cut, rotating the entire frame around the pivot 42.

The stay cable 40 provides means of holding the digging prongs 12 to the cut and takes the strain of cutting from the frame of the lower separator.

The object of this invention is to provide suitable means to dig by mechanical means potatoes or like products and provide suitable means whereby all foreign matter attached or intermingled caused by the digging can be eliminated. The following explanation will enable all persons familiar with the art to which it appertains to readily understand its operation.

As the apparatus is propelled in a forward direction, the digging prongs cut to the depth desired. The continual forward movement slides the product being dug and the earth back over to where the draper bars slide the entire mass up on the inclined separating rolls 1. All small broken up foreign matter passes through the space between the rolls, and on account of the rollers 1 turning the entire mass is continually agitated upon the surface of the rollers, the process of cleaning being continuous. The large lumps of dirt encounter the oblique fixed bars 9 and are slid along toward the sides and discarded over the sides of the lower separator. The remaining earth and potatoes or produce is carried on over the shield 41 and drops through the blast of air from the blower 10 which eliminates the lighter foreign matter. The remaining mass discharges into chute 11 which discharges on the conveyer 22 having small cleats 42ᵃ, which carries the mass up and dumps it into the chute 23 which in turn discharges onto the top separating rolls where the same cycle of operation takes place as already explained.

The rollers 1 are each adjustable so that distance between rollers can be regulated for various soils that may be encountered.

It will be readily seen that the apparatus provides a durable mechanical means whereby potatoes and like products can be quickly and easily dug.

Various other changes and modifications in the structural details may be made without a departure from the spirit and scope of the invention.

We claim:

1. In a potato or like harvesting apparatus, an inclined series of parallel spaced rollers, a supporting frame, bearings for the rollers on the frame and adjustable laterally to vary the spacing between the rollers, and a draper traveling over the rollers in the direction of the length thereof.

2. In a potato or like harvesting apparatus, an inclined series of parallel spaced rollers, a supporting frame for the rollers, a draper traveling over the rollers in the direction of the length thereof, and deflecting bars mounted obliquely above the draper.

3. In a potato or like harvesting apparatus, an inclined series of parallel spaced rollers, a supporting frame for the rollers, means for carrying the products along the rollers in the direction of the length thereof, and deflecting bars mounted obliquely above said means.

4. In a potato or like harvesting apparatus, an inclined series of parallel spaced rollers, a supporting frame, bearings for the rollers on the frame and adjustable laterally to vary the spacing between the rollers, and means for carrying the products along the rollers in the direction of the length thereof.

5. In a potato or like harvesting apparatus, an inclined series of parallel spaced rollers, a supporting frame for the rollers, means for carrying the products along the rollers in the direction of the length thereof, a chute into which the products are discharged as they leave the rear ends of the rollers, and a second series of parallel spaced rollers, means for carrying the products along said second series of rollers in the direction of the length thereof, and means for conveying the products from the chute to the second mentioned series of rollers.

In testimony whereof we have affixed our signatures in presence of two witnesses.

HARVEY F. UPTON.
MILTON E. FISHER.
GEORGE L. WOLF.

Witnesses:
W. W. DOOLITTLE,
CHAS. H. YOUNG.

Copies of this patent may be obtained for five cents each, by addressing the "Commissioner of Patents, Washington, D. C."